Figure 1:
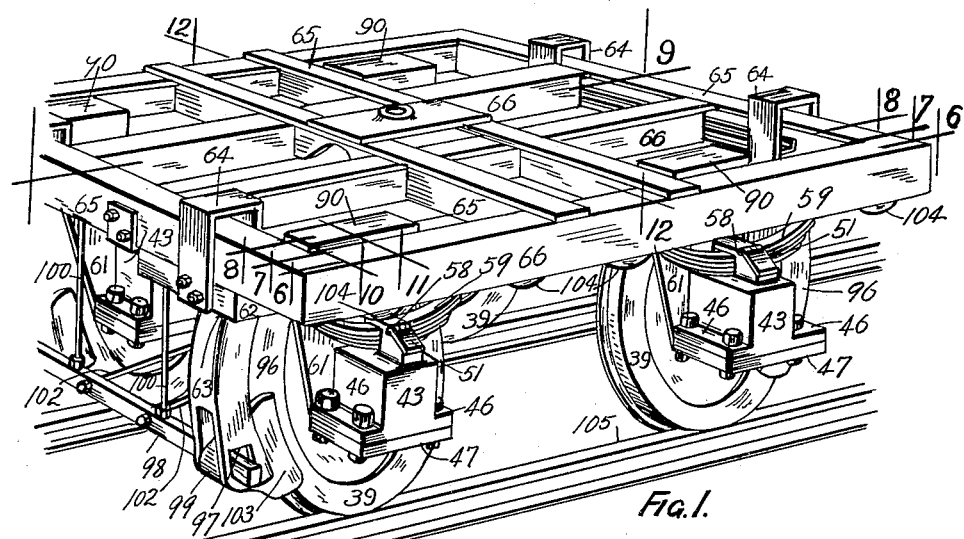
Figure 2:
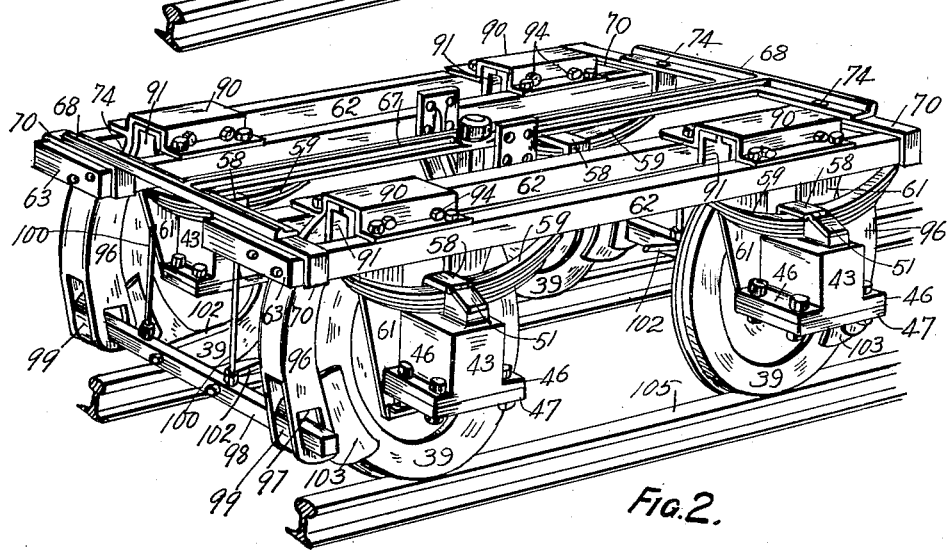
Figure 3:
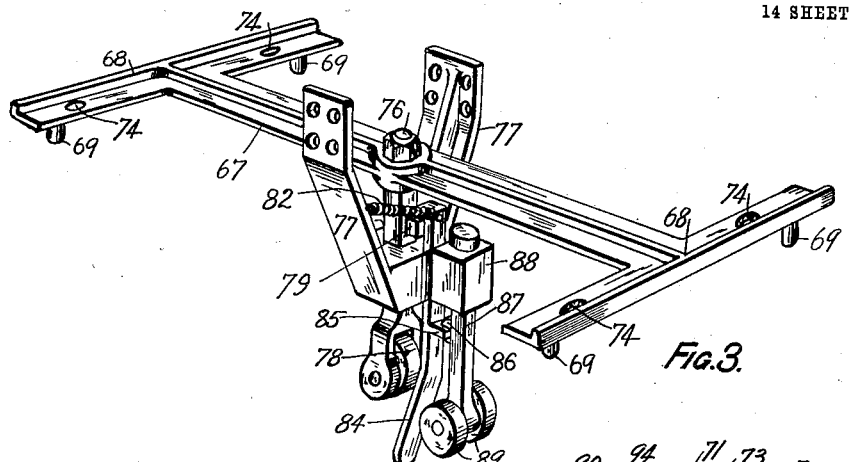
Figure 4:
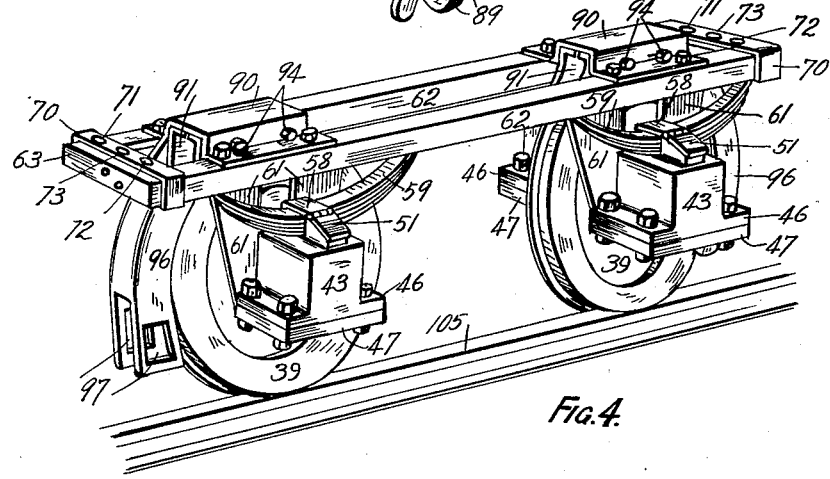
Figure 5:
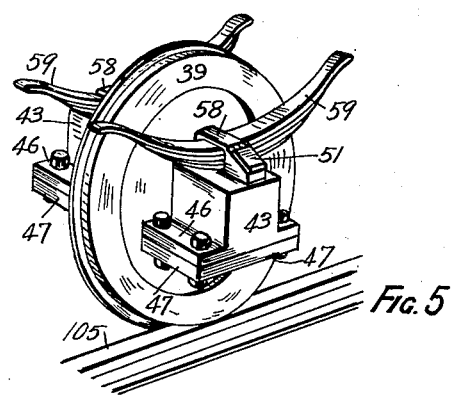
Figure 6:
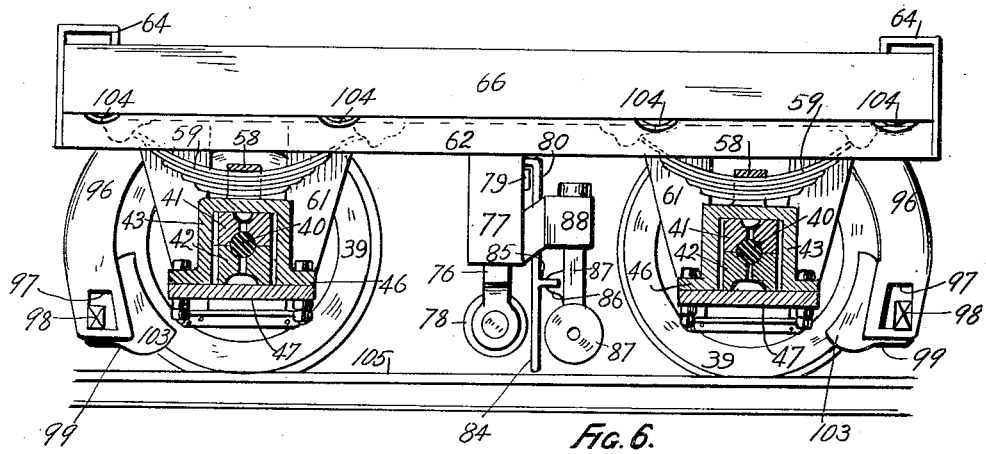
Figure 7:
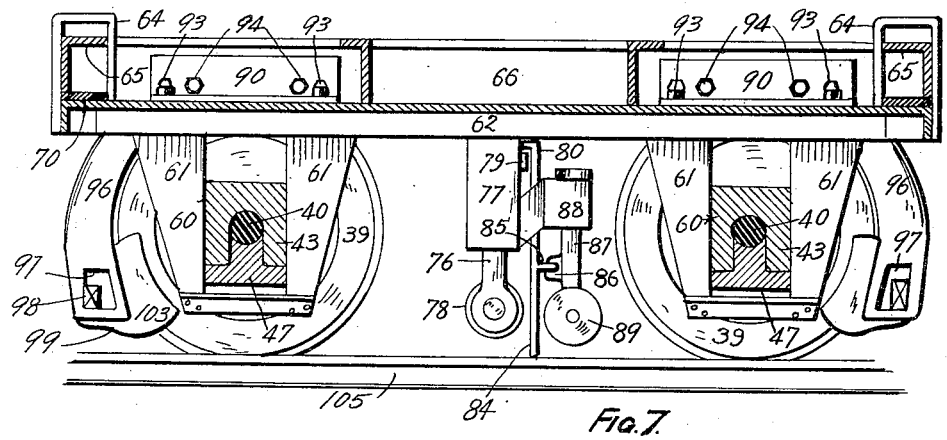
Figures 8, 9:
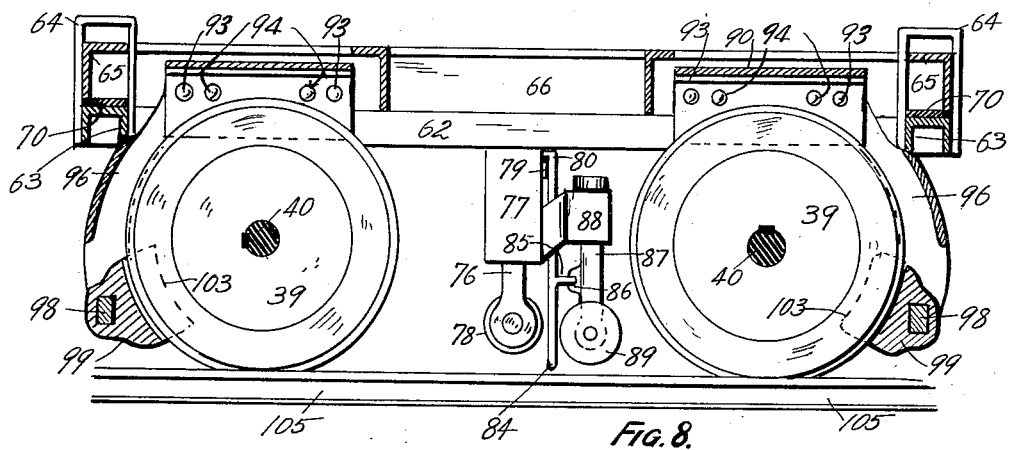

A. R. ANGUS.
RUNNING GEAR OF RAILWAY CARS.
APPLICATION FILED JULY 7, 1910.

1,077,505.

Patented Nov. 4, 1913.
14 SHEETS—SHEET 1.

WITNESSES
W. P. Burke
L. Hajek

INVENTOR
Arthur R. Angus
BY
Wm. Wallace White
ATTY.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 2.

WITNESSES
W. P. Burke
L. Najek

INVENTOR
Arthur R. Angus
BY Wm. Wallace White
ATTY.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 3.

WITNESSES
W. P. Burke
L. Najek

INVENTOR
Arthur R. Angus
BY Wm Wallace White
ATTY.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 4.

WITNESSES
W. P. Burks
L. Hajek

INVENTOR
Arthur R. Angus
BY Wm Wallace White
ATTY.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 5.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 6.

WITNESSES
W. P. Burke
L. Najek

INVENTOR
Arthur R. Angus
BY Mr. Wallace White
ATT'Y

A. R. ANGUS.
RUNNING GEAR OF RAILWAY CARS.
APPLICATION FILED JULY 7, 1910.

1,077,505.

Patented Nov. 4, 1913.
14 SHEETS—SHEET 7.

WITNESSES
W. P. Burk
L. Najek

INVENTOR
Arthur R. Angus
BY Wm Wallace White
ATTY

A. R. ANGUS.
RUNNING GEAR OF RAILWAY CARS.
APPLICATION FILED JULY 7, 1910.

1,077,505.

Patented Nov. 4, 1913.
14 SHEETS—SHEET 8.

INVENTOR
Arthur R. Angus,
BY Wm Wallace White
ATTY.

WITNESSES
W. P. Burke
L. Najek

COLUMBIA PLANOGRAPH CO., WASHINGTON, D. C.

A. R. ANGUS.
RUNNING GEAR OF RAILWAY CARS.
APPLICATION FILED JULY 7, 1910.
1,077,505.
Patented Nov. 4, 1913.
14 SHEETS—SHEET 9.
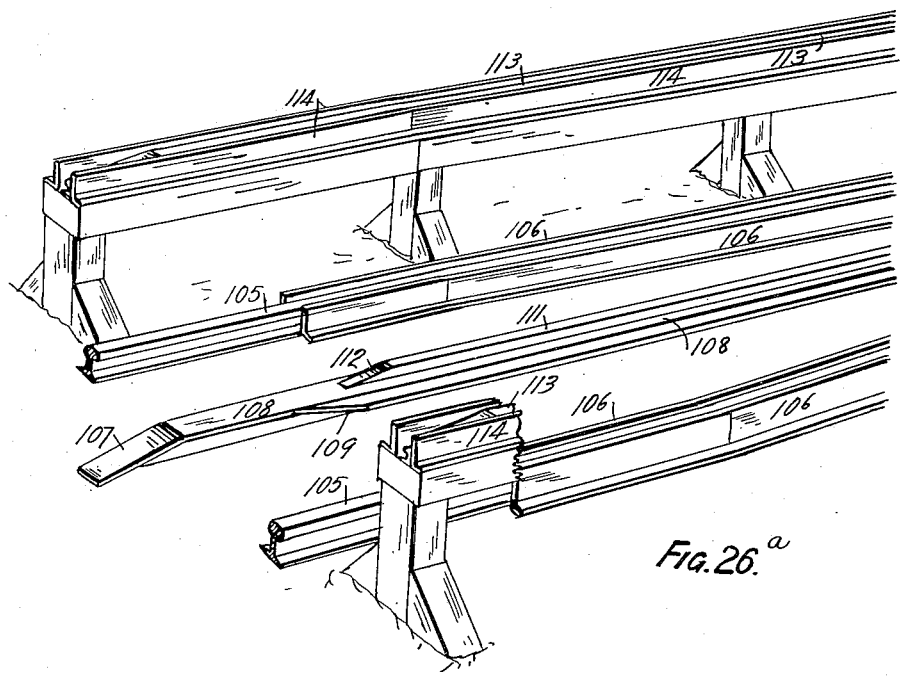
Fig. 26.$^a$
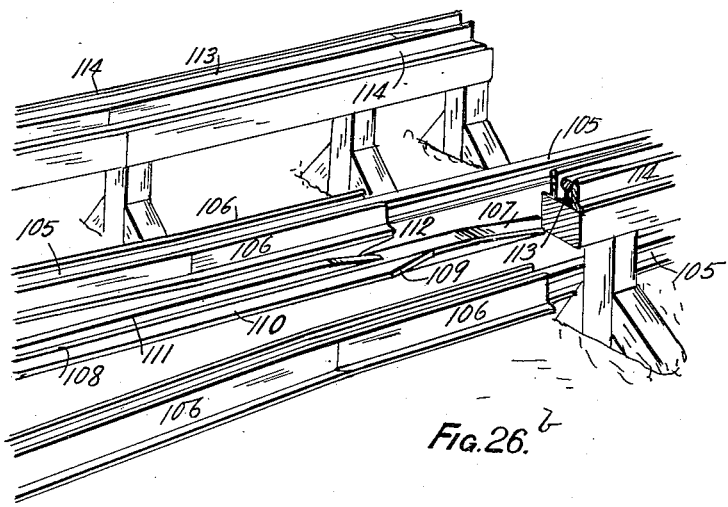
Fig. 26.$^b$ A. R. ANGUS.
RUNNING GEAR OF RAILWAY CARS.
APPLICATION FILED JULY 7, 1910.
1,077,505.
Patented Nov. 4, 1913.
14 SHEETS—SHEET 10.
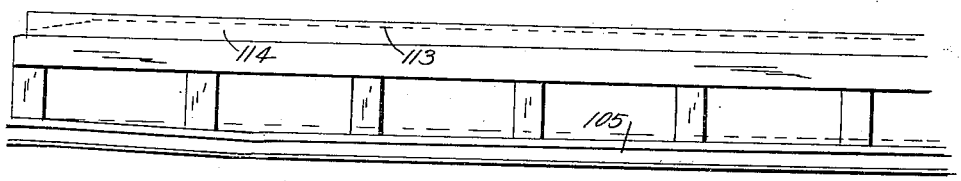
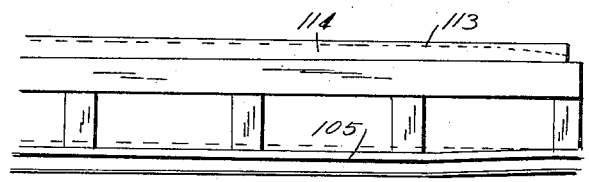
Fig. 27.
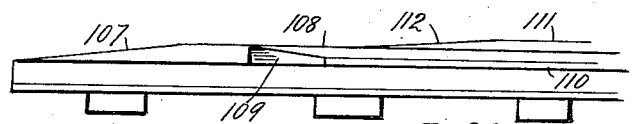
Fig. 28.
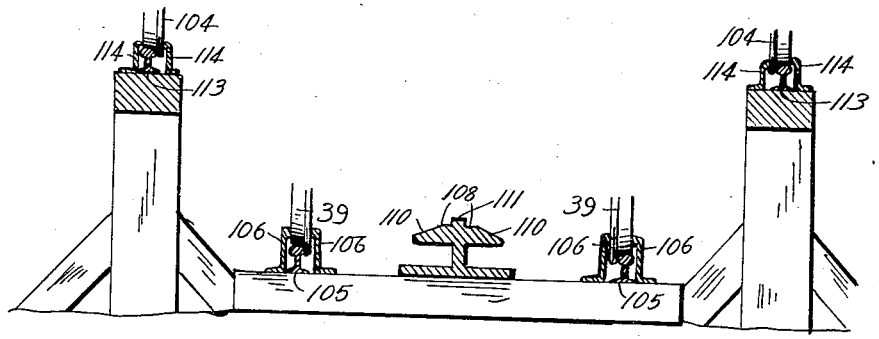
Fig. 29.
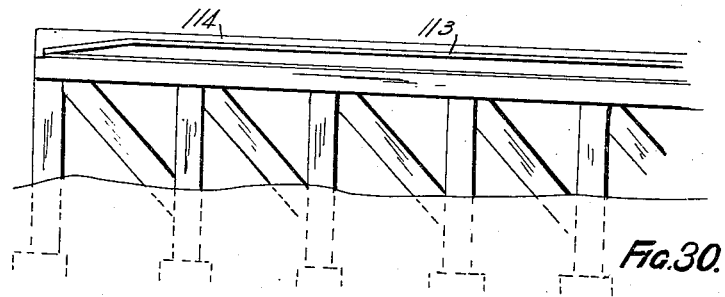
Fig. 30.
WITNESSES
INVENTOR
Arthur R. Angus
BY Mr Wallace White
ATTY.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 11.

WITNESSES
W. P. Burke
L. Najek

INVENTOR
Arthur R. Angus
BY Wallace White
ATTY

A. R. ANGUS.
RUNNING GEAR OF RAILWAY CARS.
APPLICATION FILED JULY 7, 1910.

1,077,505.

Patented Nov. 4, 1913.
14 SHEETS—SHEET 12.

WITNESSES
W. P. Burke
L. Najek

INVENTOR
Arthur R. Angus
BY Wm Wallace White
ATTY.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 13.

A. R. ANGUS.
RUNNING GEAR OF RAILWAY CARS.
APPLICATION FILED JULY 7, 1910.

1,077,505.

Patented Nov. 4, 1913.
14 SHEETS—SHEET 14.

WITNESSES
W. P. Burke
L. Najek

INVENTOR
Arthur R. Angus
BY Wm. Wallace White
ATTY.

UNITED STATES PATENT OFFICE.

ARTHUR REGINALD ANGUS, OF SPIT ROAD MOSMAN, NEW SOUTH WALES, AUSTRALIA.

RUNNING-GEAR OF RAILWAY-CARS.

1,077,505.   Specification of Letters Patent.   Patented Nov. 4, 1913.

Application filed July 7, 1910. Serial No. 570,783.

*To all whom it may concern:*

Be it known that I, ARTHUR REGINALD ANGUS, a subject of the King of Great Britain, residing at Spit Road Mosman, in the State of New South Wales and Commonwealth of Australia, solicitor, have invented new and useful Improvements in the Running-Gear of Railway-Cars, of which the following is a specification.

This invention relates to running gear of railway cars, carriages, wagons and trucks or the like vehicles or rolling stock, hereinafter referred to severally and collectedly as cars or railway cars and relates more especially to devices of this character in which each wheel of a pair of wheels may rotate independently of the other so that each may accommodate its rate of rotation to the distance over which it has to travel and in which the wheels are mounted in such a manner that the railway car may run on one gage of rails and at arbitrarily fixed points with slight adjustment may run to and on another gage of rails.

Figure 10:
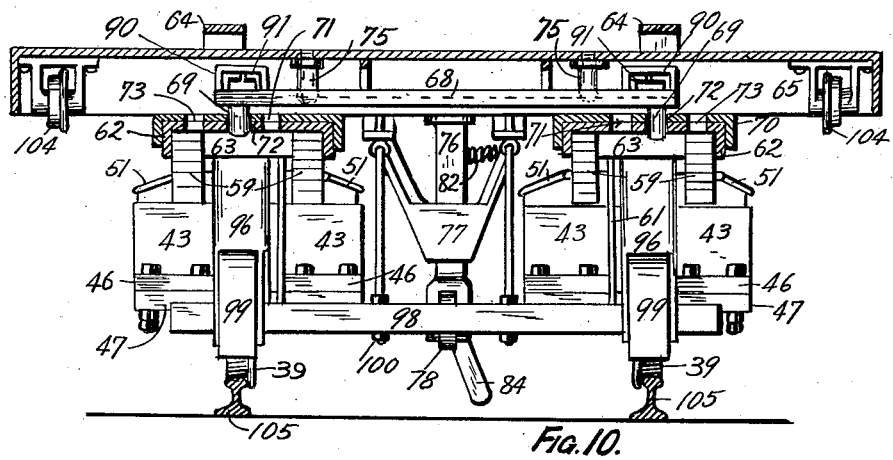
Figure 11:
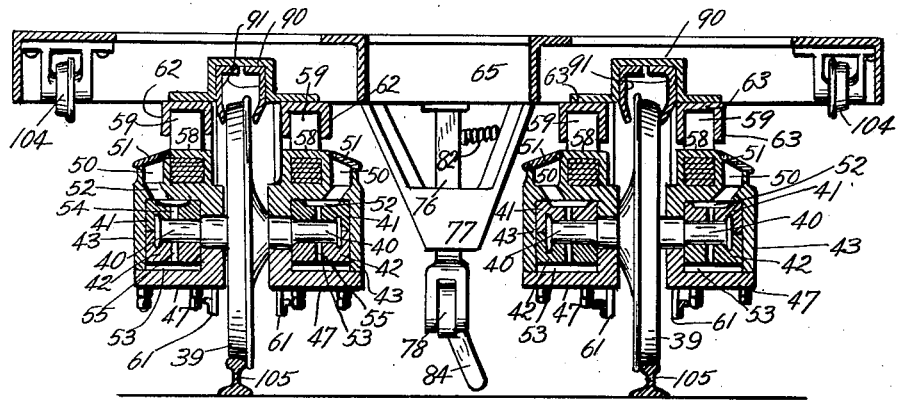
Figure 12:
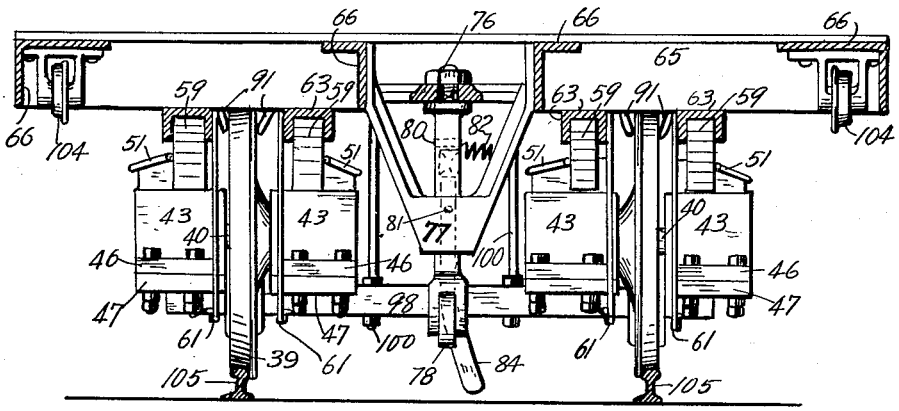
Figure 13:
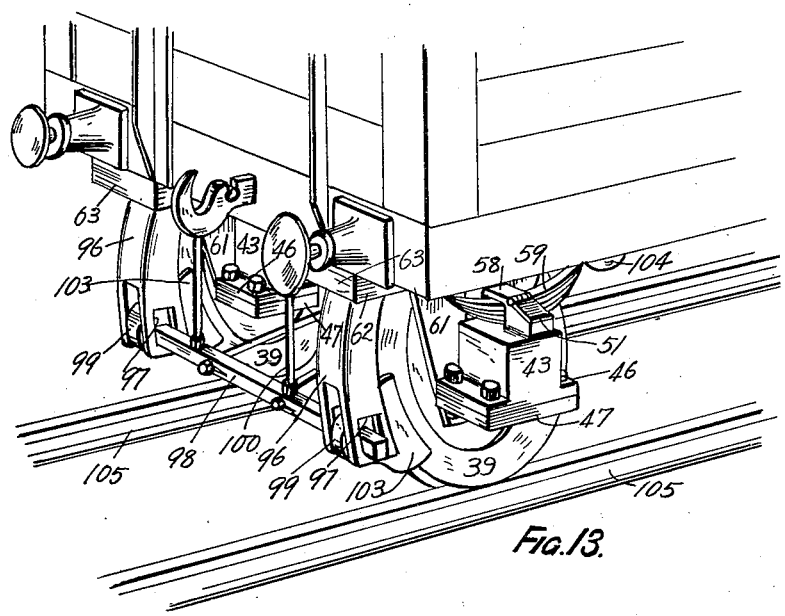
Figure 14:
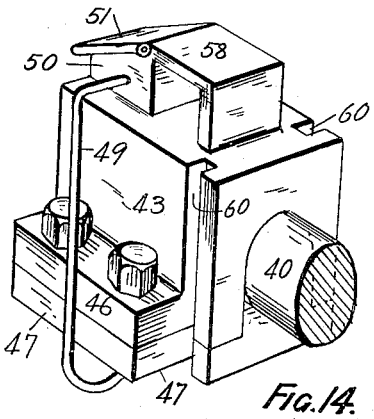
Figure 16:
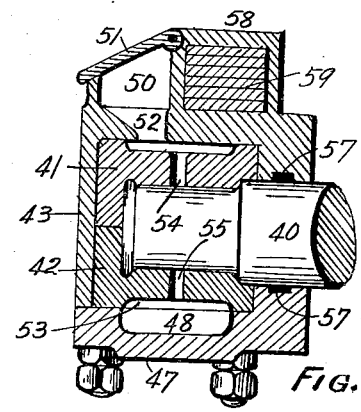
Figure 15:
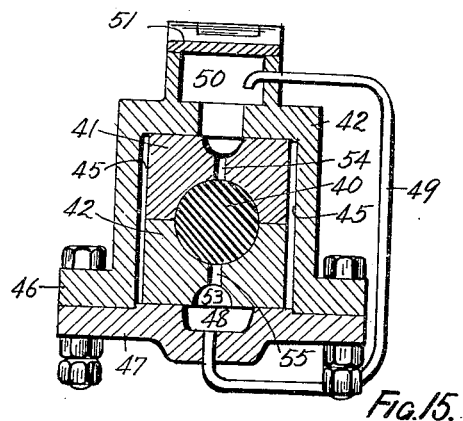
Figure 17:
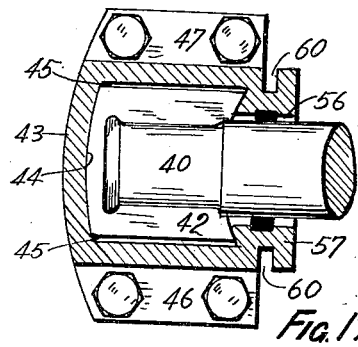
Figure 18:
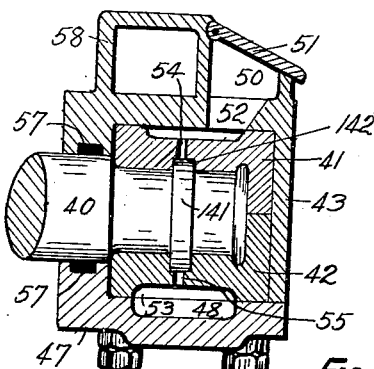
Figure 19:
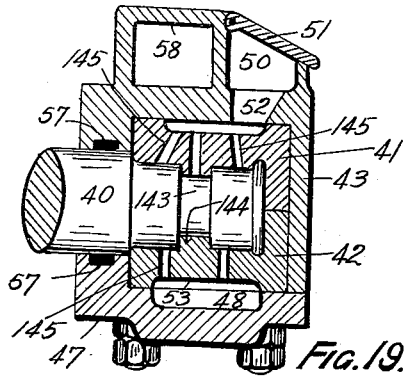
Figure 20:
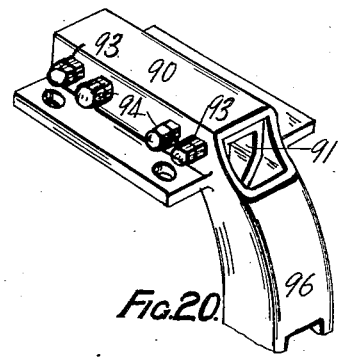
Figures 21, 24:
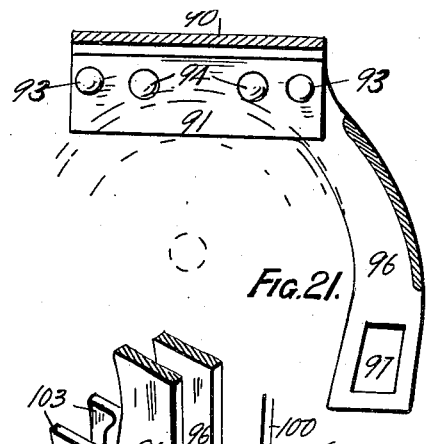
Figures 22, 23:
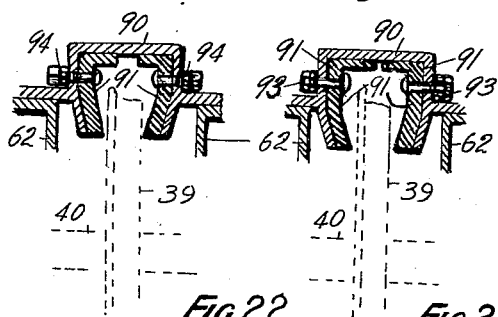
Figure 25:
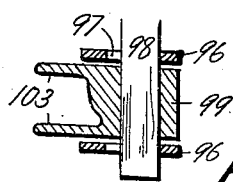
Figure 31:
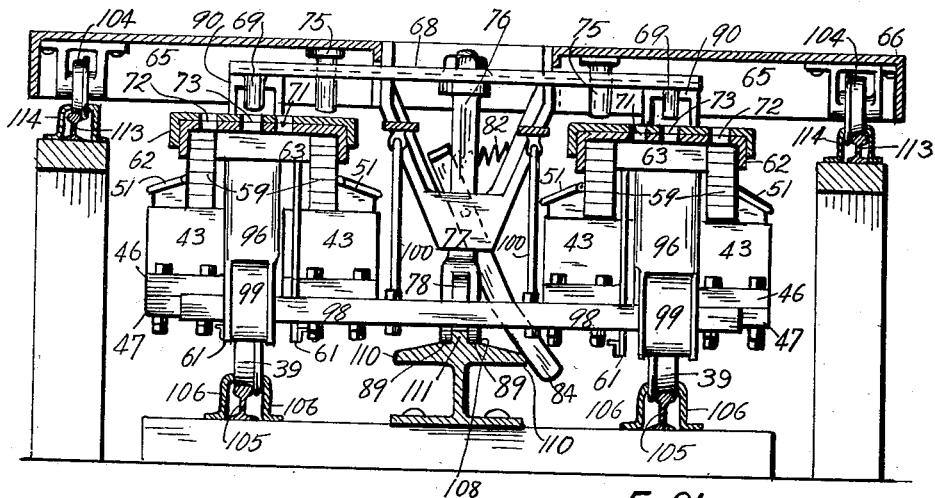
Figure 32:
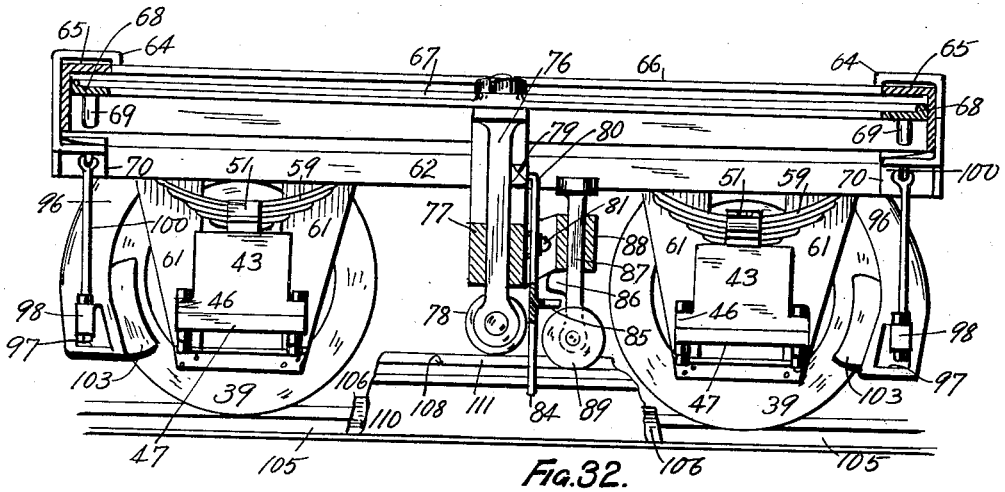
Figure 33:
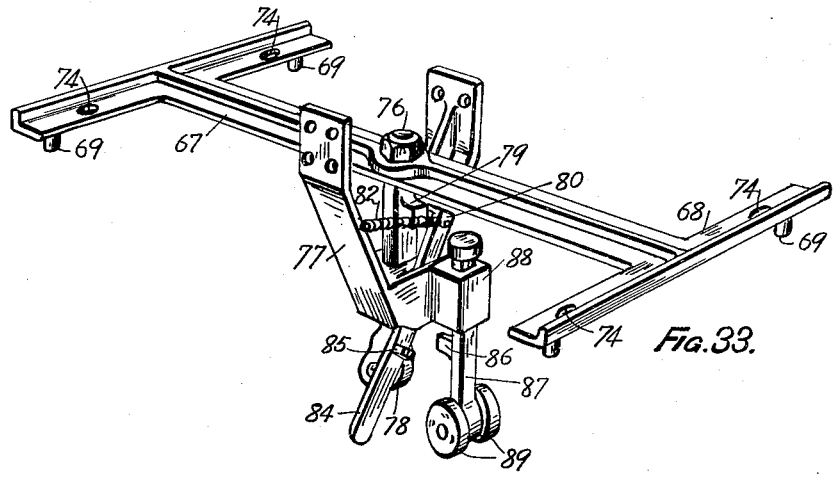
Figure 34:
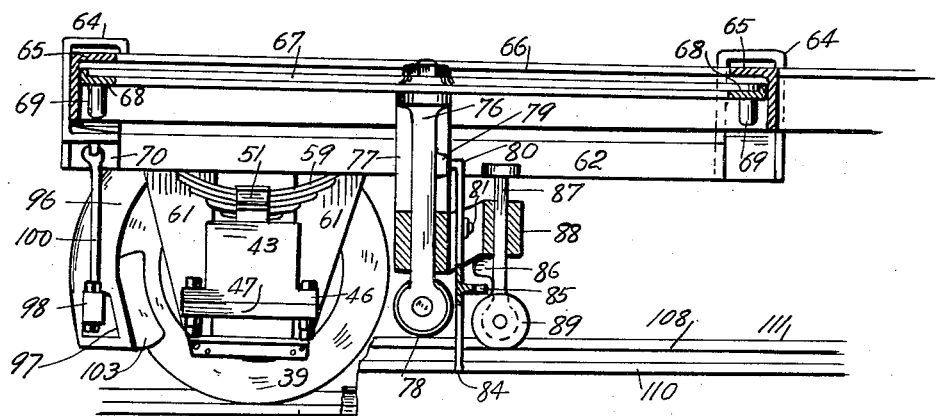
Figure 35:
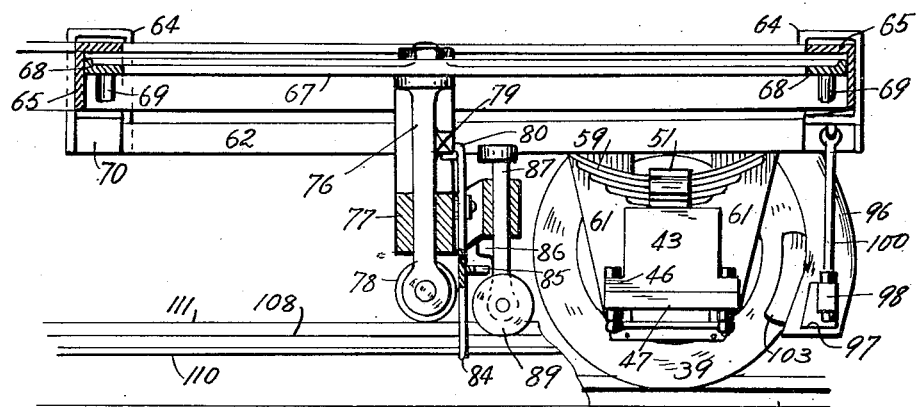
Figure 36:
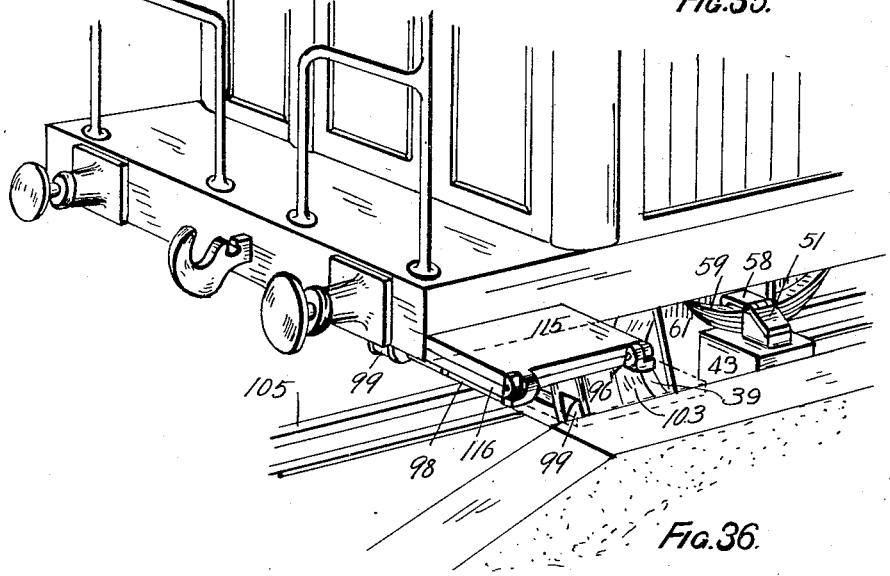
Figure 37:
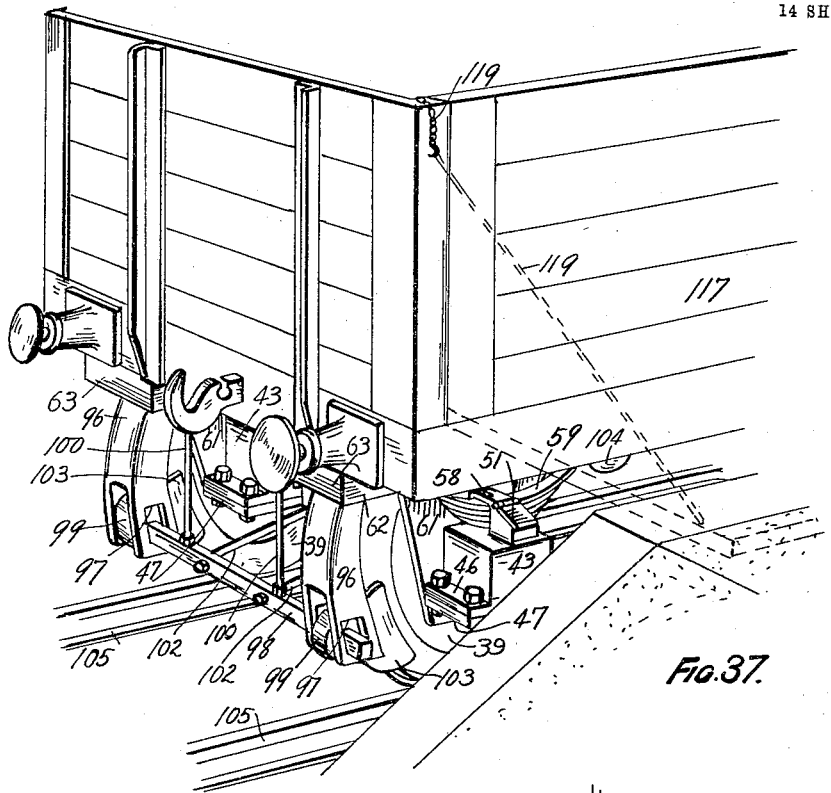
Figure 38:
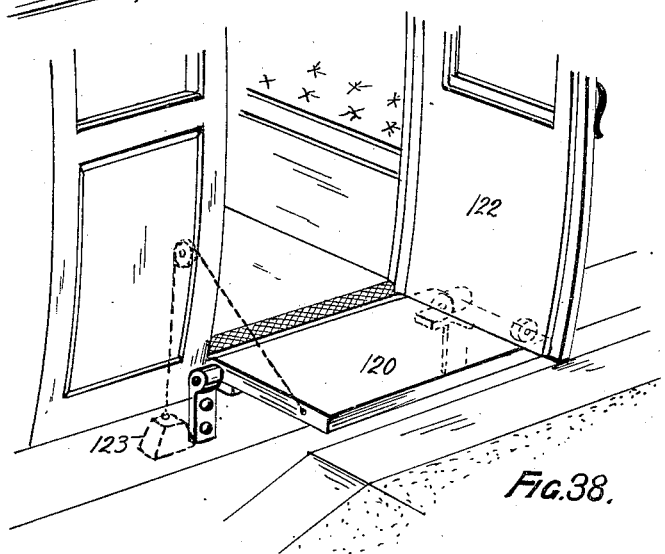

Figure 1 is a partial perspective view of the undergear of a railway car and adapted to run on lines of varying gage having divided axles. Figs. 2, 3, 4 and 5 are detail perspective views of parts of such undergear, and Figs. 6, 7, 8 and 9 are longitudinal and cross sectional elevations thereof on planes 6—6, 7—7, 8—8 and 9—9 respectively in Fig. 1. Figs. 10, 11 and 12 are sectional elevations thereof on planes 10—10, 11—11 and 12—12 respectively—same figure. Fig. 13 is a perspective view showing the end of a truck mounted upon an undergear according to this invention. Fig. 14 is a perspective of a bearing block, and Figs. 15, 16 and 17 are sectional elevations and sectional plan of same respectively. Figs. 18 and 19 are central sectional elevations of modified constructions of bearing boxes. Fig. 20 is a perspective view of an axial liner, and Fig. 21 is a central sectional elevation of the same. Figs. 22 and 23 are cross sections, and Fig. 24 is a perspective view respectively of axial liner brake shoe. etc., while Fig. 25 is a sectional plan of the latter. Figs. 26ª and 26ᵇ together form a perspective view, and Fig. 27 is an elevation of a verging shunt and appurtenances, and Fig. 28 is an enlarged detail view of the ramp rail thereof, Fig. 29 a cross sectional elevation of a verging shunt, and Fig. 30 an enlarged elevation of the elevated rail portion. Figs. 31 and 32 are cross sectional and longitudinal sectional views respectively of a bogie for a railway car having undergear according to this invention in position on a verging shunt according to same, and Fig. 33 is a perspective view of the connector lock and its mechanism of the undergear in unlocked position. Figs. 34 and 35 show the extreme ends of a four-wheel truck having undergear according to this invention and parts of a verging shunt. Fig. 36 is a perspective of a part of a corridor railway carriage having undergear according to this invention adaptable to varying gages of rails, and Figs. 37 and 38 are similar views of a truck and box carriage respectively with extension sides or flaps according to this invention.

Referring particularly to Figs. 1 to 25, each wheel 39 is provided with an independent axle 40, each end of which is reduced in the usual manner and is in engagement with a pair of bearings 41 and 42. Each pair of bearings is inclosed in a box 43, the outer end face 44 being formed in the arc of a circle whose center is preferably at the center of the axle. The outer end face of the bearings 41 and 42 are similarly curved. Between the bearings and the sides of said box are spaces 45 to allow play so that the bearings and axles may move horizontally with respect to the box when the wheels are running on a curve of a railway.

Each bearing box 43 is provided with flanges 46 and to the under surfaces of which a bridge piece or bottom 47 is bolted. This bridge piece 47 has an oil receiving well 48 formed therein and a capillary pipe 49 leads from the well 48 to an oil box 50 formed integral with the bearing box 43 and having a lid or cover 51. The bearings 41 and 42 are provided with grooves 52 and 53 and oil channels 54 and 55. The orifice 56 in the inner wall of the bearing box 43 through which the axle 40 passes is somewhat larger in diameter than the axle in order to allow horizontal movement of the latter, and has an annular dust ring 57. Integral with and positioned on the top of the bearing box 43 is a keeper 58 for the leaf spring 59.

In the modified constructions of the axle box as shown in Figs. 18 and 19, the reduced end of the axle 40 is provided with a collar 141 engaging in annular recesses 142 in the bearings 41 and 42, or the axle may be provided with an annular recess 143 adapted to be engaged by an inwardly extending collar 144 formed on the bearings 41 and 42. In the construction shown in Fig. 19, extra lubricating passages 145 are preferably provided.

Each bearing box 43 is provided with vertical grooves or guides 60 within which the horn plates 61 slidingly engage. The upper ends of the horn plates are firmly affixed to rectangular wheel frames comprising a pair of longitudinal members 62 and end members 63, the former of which rest upon the springs 59. Each end member 63 is provided with an upwardly extending holder or boxing 64 through which passes the cross bars 65 of a body or base portion having longitudinal bars 66 resting upon the wheel frames. This body or base is adapted to move vertically with respect to the wheel frames and its upward movement is limited by the boxings 64.

Between the body or base portion and the wheel frames is an intermediate framing or connector lock, preferably H-shaped, and which comprises a central longitudinal member 67 joining the cross member 68. The latter members are provided with depending studs or holding pins 69 adapted to engage one or the other of a series of orifices 71, 72 and 73 corresponding to the varying gages of the railway which are formed in the bracings 70 carried by the end members 63. The inner pair of orifices 71 are engaged by the pin 69 when the device is used on a railway of wide gage and the outer orifices 72 are engaged by the pin 69 when the device is used on a railway of narrow gage. The central orifices 73 are engaged by the pins 69 if the device is used upon a railway of intermediate gage. This connector lock is provided with orifices 74 adapted to receive guide pins 75 affixed to the cross bars 65 of the body or base and it is also provided with a stem or lifter 76 depending vertically and centrally from the longitudinal member 67. This lifter 76 slides in a bearing bracket 77, affixed to and depending from the longitudinal bars 66 of the body or base, and carries at its lower end a friction roller 78. It is further provided with a lug 79 with which the turned in end of a locking lever 80 normally engages. This lever, which is fulcrumed to the bearing bracket 77 at 81, is maintained in its normal position by a coil spring 82 and is further provided with a slanting tail piece 84. The locking lever 80 also has a horizontal engaging piece 85 engaging a key 86 formed integral with a second vertical stem 87 which is slidingly mounted in a bearing 88 integral with the bracket 77, and which carries at its lower extremity a pair of friction rollers 89.

Positioned above each wheel and secured to the longitudinal members 62 of the wheel frames are arches or bridges 90 which act as axial liners to the wheels and maintain the wheels in a vertical plane. These axial liners 90 have angular inset flanges upon which caliper plates 91 are rigidly supported by means of transverse bolts 93 and 94. Extending downwardly from the bridges 90 are the brake block holders comprising cheeks 96 having rectangular orifices 97 formed therein, the orifices being larger than the rectangular brake bar 98 which slidably passes through them and which slidably support the brake blocks 99 which are positioned between the cheeks 96. The brake bars 98 are supported by the hangers 100 pivoted to brackets secured to the bars 65 of the body or base. The brake bars have hounds 102 and are operated in the usual manner, while the brake blocks 99 have cheeks 103 embracing the side faces of the wheels 39.

Affixed to the outer longitudinal bars of the body or base are small runners or flanged wheels 104.

Figs. 26ᵃ to 30 show a verging shunt for effecting a change of gage and it also shows the mechanism for operating the changing and locking gear. The ordinary track rails 105 are made to converge or diverge from one gage to the other, preferably at a ratio not exceeding one in two hundred, and check rails 106 are provided on either side of the rails 105, which check rails are sufficiently high to embrace the side faces of the wheels 39. Centrally positioned with respect to the converging or diverging portion of the track and extending beyond either end thereof, is a ramp rail having ramp ends 107 and a flat portion 108, adapted to be engaged by the hereinbefore mentioned rollers 89 of the stem 87. A horizontal flange 110 is found on either side of the flat portion 108 and is provided with tapering ends 109 which extend to within a short distance of the ramp ends 107. These flanges are for the purpose of operating the hereinbefore mentioned locking lever 80. Centrally positioned with respect to the flat portion 108 is a raised track 111 having ramp ends 112 for operating the hereinbefore mentioned lifter 76. Located at either side of the main track are supplementary rails 113 which extend beyond the central ramp rail and which converge or diverge in accordance with the track rails 105. These rails 113 have ramp ends and have check rails 114 on either side adapted to embrace the hereinbefore mentioned runners or wheels 104 carried by the body base. At this point the main track is preferably a little below the ordinary level so that as the wheels 104 carried by the body or base engage the supplementary track 113 the undergear will lower and the necessity of lifting the body of the vehicle will be avoided.

In the four-wheeled truck or in a similar vehicle, as shown in Figs. 34 and 35, each pair of transversely corresponding wheels has its own particular locking apparatus, that is, its own connector lock with lifting and locking devices, because in comparatively long vehicles it would not be practicable to use but one connector lock.

Figs. 36, 37 and 38 illustrate the manner in which the space between platforms and vehicles built for narrower gage is provided for. The corridor carriage type of vehicle has a hinged extension piece 115 on the end platforms which is pivoted to the ordinary step 116, and this extension piece is adapted to extend over the edge of the station platform and so bridge the space between the step and the station platform. In trucks and the like as in Fig. 37 the sides 117 are hinged at the bottom and may be lowered by means of chains 119 to form the necessary bridging platform. Carriages with compartments having separate doors have at each door a hinge and overbalanced or spring step 120 which is moved automatically to its operative position by the opening of the door by means of a roller 121 secured to the bottom of the door 122. Normally, that is when the door is shut, the step is closed up over said door by the weight 123, or by some other device.

The operation during the change of gage is as follows: As the car approaches the verging shunt, the small wheels 104 on the body or base will engage the ramp ends of the supplementary rails 113 and the gear beneath will lower itself, thus raising the body or base from the wheel frames and the connector lock sufficiently to allow the latter to rise in order to free the pins 69 from orifices 71, 72 or 73. Now when the rollers 89 upon the stem 87 contact with the ramp rail 108, the stem is lifted and frees the key 86 from the engaging piece 85, so that when the tail piece 84 of the locking lever 80 engages the horizontal portion 110 it will be moved to one side, thus allowing the lifter 76 as its roller 78 engages the raised track 111 to lift the connector lock and disengage its studs or locking pins 69 from the orifices 71, 72 or 73. The wheels of the car are then moved inwardly or outwardly by the check rails 106 of the verging shunt, and when the wheels are thus adjusted to gage the lifter 76, leaving the end of the raised track 111, drops to its normal position and the locking pins 69 of the connector lock enter those gage orifices which have been placed in registry with them. The locking bar 80 is then freed from the rail 110 and by the action of the spring 82 locks the lifter 76. As the rollers 89 leave the track 108 the stem 87 drops, thus permitting the key 86 to lock with the engaging device 85. One longitudinal member of each wheel frame is preferably placed at one side and the other at the other side of their common wheels at an equal distance therefrom so as to effect as nearly as possible what may be termed a static equilibrium of each wheel and its axle.

What I claim as new and desire to secure by Letters Patent is:—

1. Railway car running gear comprising two wheel frames located respectively at the two sides of a car and adjustable transversely thereto independently of each other, a running wheel mounted in each of said frames, means on the track adapted to move said wheels and wheel frames transversely so as to change the gage of said wheels, means adapted to lock said frames in any position to which they may be adjusted by said means on said track, means adapted to unlock said frames before their transverse adjustment by said means on said track and to keep them unlocked during said transverse adjustment, and means adapted to relieve said running wheels of the weight of the body of said car during said transverse adjustment.

2. In running gear of railway cars, in combination, transversely adjustable wheel frames, independently rotatable wheels on semi-axles carried thereby, a vertically movable connector lock adapted to lock said wheel frames at varying gages and a vertically mounted body portion supported by said frames above said connector lock.

3. In running gear of railway cars, in combination, transversely adjustable wheel frames, independently rotatable wheels carried thereby, a body supported by said wheel frames and adapted to move vertically with respect thereto, a connector lock operatively associated with said body and vertically movable with respect thereto, said connector lock being provided with devices engaging said wheel frames, devices on the railway adapted to raise said body and to support it above said connector lock, devices on the railway to raise said connector lock from said wheel frames and to move said wheel frames transversely with respect to the body and to restore said connector lock and body to their normal positions, substantially as described.

4. In running gear of railway cars, in combination, transversely adjustable wheel frames, independently rotatable wheels carried thereby, a body supported by said wheel frames and adapted to move vertically with respect thereto, a connector lock operatively associated with said body and vertically movable with respect thereto, said lock having studs or holding pins, said frames having orifices corresponding to varying gages of wheels adapted to be engaged by said studs, and devices depending from said running gear or car structure adapted as the car is traveling through a verging shunt or change of gage station by contact with devices therein to support the weight of the car structure above said connector lock and said wheel frames to raise said connector lock free of said wheel frames to effect the adjustment of the gage of wheels and to restore the parts to proper normal position, substantially as described.

5. In running gear of railway cars, in combination, transversely adjustable wheel frames, independently rotatable wheels carried thereby, a body supported by said wheel frames and adapted to move vertically with respect thereto, a connector lock operatively associated with said body and vertically movable with respect thereto, said lock being provided with holding pins, said frames having orifices adapted to be engaged by said holding pins for varying gages of the wheels, devices for supporting the body above said connector lock and wheel frames, a lifter on said lock, a ramp rail adapted to engage said lifter for lifting said lock and withdrawing the holding pins from the orifices in the wheel frames and for permitting the lowering of said lock to enable said holding pins to engage in other orifices in the wheel frames, and locking devices for preventing movement of said lifter except at the proper time and place, substantially as described.

6. In running gear of railway cars, in combination, transversely adjustable wheel frames, independently rotatable wheels carried thereby, a body supported by said wheel frames and vertically movable with respect thereto, a connector lock operatively associated with said body and vertically movable with respect thereto, said lock having holding pins thereon, said frames being provided with orifices adapted to be engaged by said holding pins for varying gages of the wheels, devices for supporting the body above and clear of said connector lock, a lifter on said lock, a ramp rail adapted to engage said lifter for lifting said lock and withdrawing the holding pins from the orifices in the wheel frames and for permitting the lowering of said lock to enable said holding pins to engage in other orifices in the wheel frames, a tail lever to lock said lifter in normal position, a device to engage said tail lever to release said lifter and means to prevent movement of said tail lever to release said lifter except at the proper time and place, substantially as described.

7. Railway car running gear comprising a running wheel, an axle rigidly secured to said running wheel and projecting at both sides thereof, bearing blocks fitting the two ends of said axle, and axle boxes in which said bearing blocks fit so as to be movable therein to a limited extent transversely to said axle, each of said axle boxes comprising a wall at the side thereof remote from said wheel, said bearing block and said walls fitting together and having contacting surfaces which in plan are arcs of a circle the center of which is at the center of said wheel.

8. In running gear of the class described, in combination, semi-axles, bearings therefor, an axle box completely surrounding each of said bearings and having a bottom bridge piece and an upper extension adapted to be attached to the upper structure of the car or to the spring supports of same, substantially as described.

9. Railway car running gear comprising a running wheel, an axle rigidly secured to said running wheel and projecting at both sides thereof, bearing blocks fitting the two ends of said axle, and axle boxes in which said bearing blocks fit so as to be immovable therein vertically but to be movable therein to a limited extent transversely to said axle, each of said axle boxes comprising a wall at the side thereof remote from said wheel, said bearing block and said walls fitting together and having contacting surfaces which in plan are arcs of a circle the center of which is at the center of said wheel.

10. Railway car running gear comprising a running wheel, an axle rigidly secured to said running wheel and projecting at both sides thereof, bearing blocks fitting the two ends of said axle, axle boxes in which said bearing blocks fit so as to be movable therein to a limited extent transversely to said axle, a wheel frame, horn plates extending vertically from said wheel frame and fitting in grooves in said axle boxes so as to allow of vertical movement of said axle boxes, and springs interposed between said axle boxes and said wheel frame.

11. Railway car running gear comprising a running wheel, an axle rigidly secured to said running wheel and projecting at both sides thereof, bearing blocks fitting the two ends of said axle, axle boxes in which said bearing blocks fit so as to be movable therein to a limited extent transversely to said axle, a wheel frame, horn plates extending vertically from said wheel frame and fitting in grooves in said axle boxes so as to allow of vertical movement of said axle boxes, springs interposed between said axle boxes and said wheel frame, and means attached to said frame and adapted by contact with said wheel to limit the lateral motion thereof after the bearing surfaces of its axle have become worn.

12. In running gear of the class set forth, in combination, a wheel frame, semi-axles, bearings therefor, axle boxes, horn plates carried by said frame and slidingly engaging said axle boxes and axial liners supported from said wheel frames, substantially as described.

13. In running gear of the class described, in combination, a pair of parallel transversely adjustable wheel frames, a vertically movable body portion, and a connector lock operatively associated with said body portion and said frames and adapted to be locked to said wheel frames against movement at varying gages of the track.

14. In running gear of the class described, in combination, a pair of parallel transversely adjustable wheel frames provided with orifices, a vertically movable body portion, a connector lock operatively associated with said body base and having holding pins adapted to enter one or the other of said orifices in said wheel frames to lock said frames against movement at varying gages of wheels, substantially as described.

15. In running gear of the class described, in combination, a pair of parallel transversely adjustable wheel frames provided with orifices, a vertically movable body portion, a connector lock operatively associated with said body base and having holding pins adapted to enter one or the other of said orifices in said wheel frames and a lifter adapted to be actuated by track mechanism to raise said connector lock to free said holding pins from the orifices and to lower said connector lock to enable the holding pins to engage other orifices of the same, substantially as described.

16. In running gear of the class described, in combination, a pair of parallel transversely adjustable wheel frames provided with orifices, a vertically movable body portion, a connector lock operatively associated with said body portion and having holding pins adapted to enter one or the other of said orifices in said wheel frames, a lifter adapted to be actuated by a track member to raise said connector lock to free said holding pins from the orifices and to lower said connector lock to enable the holding pins to engage other orifices and lifter locking means adapted to be actuated by a track member.

17. In running gear of the class described, in combination, a pair of parallel transversely adjustable wheel frames provided with orifices, a vertically movable body portion, a connector lock operatively associated with said body base and having holding pins adapted to enter one or the other of said orifices in said wheel frames, a lifter adapted to be actuated by a track member to raise said connector lock to free said holding pins from the orifices and to lower said connector lock to enable said holding pins to engage other orifices, means adapted to be actuated by a track member to raise said lifter, means normally locking said lifter against movement and means normally engaging said locking means and adapted to be actuated out of engagement therewith by a track member.

18. In running gear of the class described, in combination, parallel transversely adjustable wheel frames, a vertically movable body portion, a vertically movable connector lock, a lifter for said connector lock, a lever normally engaging said lifter and holding it against movement, and a locking stem normally engaging said lever and adapted to be moved out of engagement therewith by a track member, whereby said lever will move out of engagement with said lifter.

19. In running gear of the class set forth, in combination, parallel transversely adjustable wheel frames, a vertically movable body portion, a vertically movable connector lock, a lifter for said connector lock, a lever normally engaging said lifter and holding it against movement, a locking stem normally engaging said lever and adapted to be moved out of engagement therewith by a track member, whereby said lever will move out of engagement with said lifter, supporting wheels carried by said body portion, and a track member adapted to be engaged by said supporting wheels and to support said body portion, when the same has been moved vertically with respect to said frames.

20. In running gear of the class set forth, in combination, a body portion, wheel frames adapted to be moved transversely with respect thereto, a connector lock for holding said frames against movement, wheels operatively associated with said frames, a brake beam and a brake block embracing the tread of one of said wheels and adapted to slide horizontally on said beam, substantially as described.

21. In running gear of the class described, in combination, a body portion, wheel frames adapted to be moved transversely with respect thereto, a connector lock for holding said frames against movement, wheels operatively associated with said frames, a brake beam freely suspended from said wheel frames, a brake block embraced by cheeks affixed to the adjacent wheel frame and adapted to slide on said brake beam, whereby it may move transversely with said wheel frame, substantially as described.

22. Railway vehicle running gear comprising two wheel frames located respectively at the two sides of a vehicle and adjustable transversely thereto independently of each other, running wheels mounted in said frames respectively, means on the track adapted to move said wheels and said frames transversely so as to change the gage of said wheels, and means whereby said frames, during their transverse adjustment, are relieved of the weight of the body of said vehicle.

23. Railway vehicle running gear comprising two wheel frames located respectively at the two sides of a vehicle and adjustable transversely thereto independently of each other, running wheels mounted in said frames respectively, means on the track adapted to move said wheels and said frames transversely so as to change the gage of said wheels, locking means adapted to lock said frames in any position to which they may be adjusted by said means on said track, said locking means being adapted to lock said frames in position by the action of the weight of the body of said vehicle thereon, and means whereby the action of the weight of the body of said vehicle on said locking means is prevented during the transverse adjustment of said frames.

24. Railway vehicle running gear comprising two wheel frames located respectively at the two sides of a vehicle and adjustable transversely thereto independently of each other, running wheels mounted in said frames respectively, means on the track adapted to move said wheels and said frames transversely so as to change the gage of said wheels, an intermediate or locking framing adapted to lock said frames in any position to which they may be adjusted by said means on said track, said intermediate framing being adapted to be held in locking position by the action of the weight of the body of the said vehicle thereon, and means whereby the action of the weight of the body of said vehicle on said intermediate framing is prevented during the transverse adjustment of said frames.

25. Railway vehicle running gear comprising two wheel frames located respectively at the two sides of a vehicle and adjustable transversely thereto independently of each other, running wheels mounted in said frames respectively, means on the track adapted to move said wheels and said frames transversely so as to change the gage of said wheels, an intermediate or locking framing adapted to lock said frames in any position to which they may be adjusted by said means on said track, and means whereby said intermediate framing is unlocked and locked before and after change of gage.

26. Railway vehicle running gear comprising two wheel frames located respectively at the two sides of a vehicle and adjustable transversely thereto independently of each other, running wheels mounted in said frames respectively, means on the track adapted to move said wheels and said frames transversely so as to change the gage of said wheels, locking means adapted to lock said frames in any position to which they may be adjusted by said means on said track, said locking means being adapted to lock said frames in position by the action of the weight of the body of said vehicle thereon, and means whereby said frames and said locking means are relieved from the action of the weight of the body of said vehicle during the transverse adjustment of said frames.

In testimony whereof I have signed my name to this specification in the presence of two subscribing witnesses.

ARTHUR REGINALD ANGUS.

Witnesses:
PERCY NEWELL,
FRED WALSH.

---

Copies of this patent may be obtained for five cents each, by addressing the "Commissioner of Patents, Washington, D. C."